(12) United States Patent
Walker

(10) Patent No.: US 10,959,062 B1
(45) Date of Patent: Mar. 23, 2021

(54) SYSTEM AND METHOD FOR PUSH-TO-TALK OVER CELLULAR INTEGRATION WITH SOFTWARE DEFINED RADIO

(71) Applicant: Tango Tango, Inc., Huntsville, AL (US)

(72) Inventor: Richard Scott Walker, Madison, AL (US)

( * ) Notice: Subject to any disclaimer, the term of this patent is extended or adjusted under 35 U.S.C. 154(b) by 0 days.

(21) Appl. No.: 16/807,714

(22) Filed: Mar. 3, 2020

Related U.S. Application Data

(63) Continuation-in-part of application No. 16/388,502, filed on Apr. 18, 2019, now Pat. No. 10,681,506.

(60) Provisional application No. 62/659,949, filed on Apr. 19, 2018.

(51) Int. Cl.
| | |
|---|---|
| *H04W 4/10* | (2009.01) |
| *H04W 4/14* | (2009.01) |
| *H04W 4/08* | (2009.01) |
| *G08B 3/10* | (2006.01) |
| *H04W 4/90* | (2018.01) |
| *H04W 88/16* | (2009.01) |

(52) U.S. Cl.
CPC ............. *H04W 4/10* (2013.01); *G08B 3/10* (2013.01); *H04W 4/08* (2013.01); *H04W 4/14* (2013.01); *H04W 4/90* (2018.02); *H04W 88/16* (2013.01)

(58) Field of Classification Search
CPC ......... H04W 4/00; H04W 4/10; H04W 76/45; H04W 88/16
See application file for complete search history.

(56) References Cited

U.S. PATENT DOCUMENTS

| | | | |
|---|---|---|---|
| 7,937,093 B2 | 5/2011 | Feher | |
| 8,101,726 B2 | 1/2012 | Parry et al. | |
| 9,204,370 B2 | 12/2015 | Mueck et al. | |
| 9,411,941 B2 | 8/2016 | Valkenborg et al. | |
| 10,009,956 B1 | 6/2018 | Feher | |
| 10,219,120 B2 | 2/2019 | Mazzarella et al. | |
| 2004/0202117 A1* | 10/2004 | Wilson | H04M 1/72552 370/310 |
| 2019/0320499 A1* | 10/2019 | Gumaer | H04W 84/027 |

* cited by examiner

*Primary Examiner* — Keith Ferguson
(74) *Attorney, Agent, or Firm* — Lanier Ford Shaver & Payne PC; Gerald M. Walsh

(57) ABSTRACT

A system and method for sending notifications of audio tone sequences to users in a push-to-talk over cellular communication system, including: decoding an audio transmission in a PTT (push to talk) server or in a PTT client, identifying audio tone sequences in the audio transmission, and sending from the PTT server or from the PTT client notifications of the identified specific audio tone sequences to users of cellular mobile devices, computers, and two-way radio communication devices. The notification may be a text message to a predefined PTT group, a delayed buffered replay of the audio transmission, the specific audio tone sequences with the audio transmission before and after the specific audio tone sequences; or an emergency alert sent to predefined members of a PTT group, or a combination thereof.

16 Claims, 8 Drawing Sheets

SYSTEM AND METHOD FOR PUSH-TO-TALK OVER CELLULAR INTEGRATION WITH SOFTWARE DEFINED RADIO

CROSS-REFERENCE TO RELATED APPLICATIONS

This patent application claims the benefit of U.S. patent application Ser. No. 16/388,502, filed on Apr. 18, 2019, which claims the benefit of U.S. Provisional Application No. 62/659,949 filed on Apr. 19, 2018, the contents of which are incorporated herein by reference.

FIELD OF THE INVENTION

This invention relates to Push-to-Talk over cellular (PTToC) communication systems and, more particularly, to PTToC systems incorporating software defined radio systems.

BACKGROUND OF THE INVENTION

IP based Push-to-Talk (PTT) systems are often referred to as PTT over Cellular (PTToC) systems because a dominant use of these systems is with mobile phones that use a mobile phone app so that a plurality of mobile phones can communicate with each other. In reality, the cellular phone connection serves to provide an IP connection from the mobile phone device to a PTT server, which is often resident in a cloud computing environment, such as Amazon Web Services (AWS). Any terminal device, such as a computer and the like, that can run a PTT application and connect via IP to the PTT Server could be used in an IP-based PTT application.

A central tenet of PTT applications is that conversations are half-duplex, which is enforced by the PTT Server employing a floor control function, which determines which user is granted transmit access (i.e. given the floor) to a PTT channel. This makes PTT applications ideal for group communications, ensuring more orderly conversations and eliminating the need for users to address their transmissions to specific users. This half-duplex characteristic arose from the use of two-way radio (LMR) usage, where it was an inherent limitation of the two-way radio technology. Digital radio systems introduced floor control functions, where users pressing the transmit button were given a denial indication if someone else had been granted access to the floor. This indication method is used today in PTToC systems.

PTT systems typically make use of the talk-group concept. A talk group is an administrative entity that is defined by a name and a set of assigned users. When a user transmits on a talk-group, all other assigned users of that talk-group will receive his or her transmission.

A natural extension to PTToC systems has been the ability to integrate two-way radio systems, allowing PTT operation across both radio and IP terminals. This is typically accomplished by employing a gateway function at the PTT server that translates a radio-oriented protocol to one usable by the PTT server. Radio integration also requires an interface at the radio system itself. There are standard digital interfaces available, such as APCO P25 based IS SI or ETSI DMR based AIS, for interfacing to digital radio systems. However, most integrations today use a simple Radio over IP (RoIP) protocol, which requires a simple interface at the radio, usually just to receive audio, to transmit audio, and to provide a push-to-talk signal.

There are no neutral standards for RoIP protocols. Many vendors simply digitize the audio signal with a standard codec (e.g. G.711, OPUS, etc.) and send it, without any signaling or link status messaging. The digitized voice is usually wrapped in RTP packets and transported via UDP/IP. Some vendors, such as JPS, have added a link status keep alive message in their proprietary protocol.

Software Defined Radio (SDR) is a radio system architecture where many radio functions traditionally implemented with specialized and dedicated hardware are instead implemented on a general-purpose computer (e.g. a PC). The general-purpose computer is connected to a small, specialized hardware receiver device, which is typically much smaller and cheaper than an entire traditional radio.

This SDR system provides numerous benefits. The system cost can be reduced because of Moore's Law based costs associated with general purpose computing. The radio application is more configurable, programmable, and manageable, compared to standard radio. The bulk of the radio functionality can be implemented remotely from the receiver hardware itself. Since donor radios have typically played a large role in PTToC architectures, SDR may impact many factors in PTToC applications. Currently, commercially available SDR devices are usually hobbyist or ham radio grade equipment and laboratory-based equipment There are many SDR software applications available, most of them free and/or open source. SDR receive-only applications are currently more viable than transmit applications, because the hobbyist-oriented market is not sufficiently large to justify manufacturers' expense for certifications required to bring commercial radio transmission equipment to market. An exception to this is SDR products that are exclusively targeted at amateur radio operators.

SUMMARY OF THE INVENTION

This invention is a push-to-talk over cellular (PTToC) communication system which has one or more push-to-talk (PTT) servers wherein the one or more PTT servers control all push-to talk functionality for a set of users for receiving and transmitting audio communication over any IP connection. The (PTToC) communication system also has a software defined radio (SDR) system consisting of SDR hardware connected to an SDR server, wherein the SDR system connects to the PTT server by means of a first gateway and an internet gateway connection. The SDR hardware has means for receiving and transmitting radio frequency (RF) signals through a radio antenna. The SDR server has software in a central processing unit connected to the SDR hardware, wherein the SDR server software is constructed to perform basic radio functions, audio frequency functions, Internet networking functions, wide area connection, and routing functions that map radio channels to PTT talk groups by means of a radio channel routing table (RCRT). The first gateway is constructed to adapt digitized audio between the SDR system and the PTT server and has a management application program interface (API) client used by a central management entity to control the SDR system. The first gateway has an SDR-PTT control protocol configured to send descriptions of the SDR server and the SDR hardware to the PTT server from the SDR server; send RCRT entries from the PTT server to the SDR server; create a secure message digest of a packet by a packet source to authenticate the packet source; describe by the SDR server the SDR receiver's carrier (COR) state for a radio frequency of interest; and describe by the PTT server any error status in the push-to-talk over cellular communication system.

The PTToC communication system has zero or more cellular mobile devices connected to the PTT server with an internet cellular connection and zero or more computer devices connected to the PTT server with an internet Wi-Fi connection. The PTToC communication system may also have a web real-time communication (WebRTC) gateway constructed to provide a WebRTC interface to one or more web browsers and a second gateway interface to the PTT server through an Internet connection. PTToC audio and signaling to WebRTC clients is thus configured to enable PTT calls from any WebRTC-enabled browser. Web URL links can be generated that are automatically distributed and whose targets cause connecting to PTT talk-groups via the WebRTC gateway.

The PTToC communication system may also have a memorandum of understanding (MOU) server with an API interface for the PTT server and with an API interface for radio consoles. The MOU server has a database containing an MOU and a ledger of all MOU transactions, wherein the PTT server and radio console are constructed to monitor and ensure talk-group membership compliance with terms of the MOU.

The PTToC communication system may further have a panic button application for cellular mobile devices, computers, and radios which are communicating over the Internet with the PTT servicer, wherein, when a panic button application is activated by a user, the PTT server is constructed to send an emergency alert to all other users having the panic button application.

In one embodiment one or more PTT servers receive audio transmissions through integrated radio channels from cellular mobile devices and computers, through the internet, and from two-way radio communication devices through a radio over internet protocol gateway and a PTT server gateway. The PTT server decodes an audio transmission and identifies one or more specific audio tone sequences. The PTT server sends notifications of the specific audio tone sequences to users of the cellular mobile devices, computers, and two-way radio communication devices. Alternatively, a PTT client may be used as the source of the audio to be decoded to perform the decoding. The PTT client is a pseudo user and included in the talk groups that have audio that is to be decoded, and in talk groups to notify other users/groups of a decoding event.

This PTToC communication system of the present invention provides numerous advantages over prior art systems. Software defined radio technology is used instead of typical donor radio to interface traditional radio systems to an IP cloud-based push-to-talk network. Audio tones are detected on a radio channel and are used to alert specific PTT users and to play the radio channel's audio. The WebRTC gateway allows anyone with a web browser to immediately join a live call. The MOU server provides a means for agencies to securely document how they wish to share the radio channels with other persons and organizations and can automatically implement the sharing that is specified in its stored agreements, via connection to APIs of various PTT systems. MOU agreements may specify that a sharing agreement be implemented only in response to a pre-defined condition, can continually check whether this condition is met, and can implement the sharing agreement if so. The panic button can start a PTT call in a predefined talk group and send a text alert to 911, in response to the panic button being activated by a user. A PTToC user can be provisioned to automatically join a specified PTT talk group if his or her GPS position ever falls within a specific predefined area. Further, auto-assign can be tiered according to level of authority. The SDR system can be configured to automatically failover to a backup IP connection whenever the primary IP connection loses connectivity.

DETAILED DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

Below is a list of acronyms used in the present disclosure.

| | |
|---|---|
| AGC | Automatic Gain Control |
| BSD | Berkly Software Distribution |
| COR | Carrier Operated Relay |
| API | Application Program Interface |
| App | Application |
| BSD | Berkley Software Distribution |
| CPU | Central Processing Unit |
| CTCSS | Continuous Tone-Coded Squelch System |
| GPS | Global Positioning System |
| GW | gateway |
| IOT | Internet of Things |
| IP | Internet Protocol or Internet |
| LMR | Land Mobile Radio |
| MOU | Memorandum of Understanding |
| OTS | Off the Shelf |
| PC | Personal Computer |
| PTT | Push to Talk |
| PTToC | Push to Talk Over Cellular |
| RCRT | Radio Channel Routing Table |
| ROIP | Radio Over Internet Protocol |
| RTC | Real Time Communications |
| RTP | Realtime Transport Protocol |
| SDR | Software Defined Radio |
| SIP | Session Initiation Protocol |
| SMS | Short Message Service |

| | |
|---|---|
| SPCP | SDR-PTT Control Protocol |
| UDP | User Data Protocol |
| URL | Uniform Resource Locator |
| USB | Universal Serial Bus |
| VoIP | Voice Over Internet Protocol |

Figure 1:
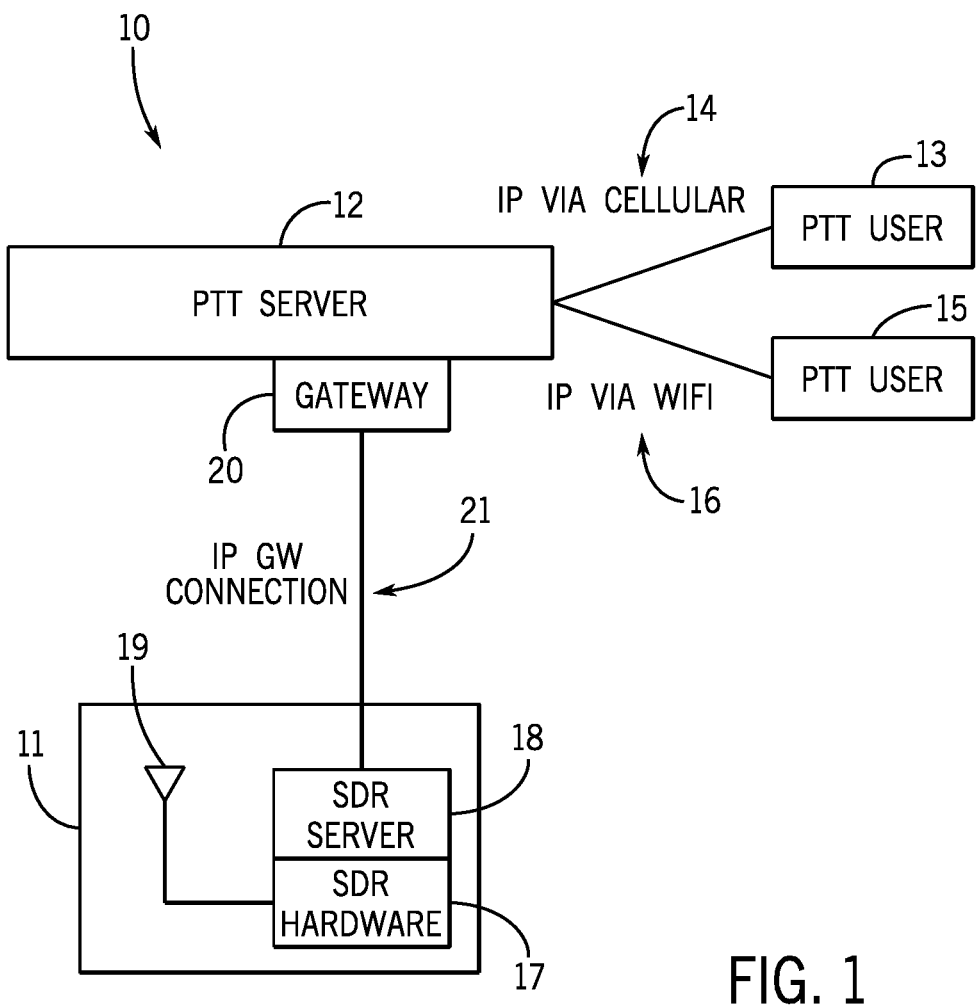
FIG. 1 is a diagram of a PTToC system integrated with a remote SDR system.

FIG. 1 shows a diagram of a PTToC system 10 integrated with a remote SDR system 11. One or more cellular mobile device users 13 can connect to the PTT server 12 via an IP cellular connection 14. One or more fixed PC device users 15 can connect to the PTT server 12 via an IP Wi-Fi connection 16. The PTT server 12 controls all push-to-talk functionality for a set of users and gateways. This includes sending/receiving audio, call management, floor control, presence determination, etc. PTT users 13 and 15 are system users that use PTT software and connect to the PTT server via IP.

The remote SDR system 11 comprises SDR hardware 17, an SDR server 18, and a radio antenna 19. The SDR system 11 connects to the PTT server 12 by means of a first gateway 20 and an IP gateway connection 21. The SDR system 11 is shown to be at a remote radio access location, chosen to be in range of a target LMR system. SDR hardware 17 may be custom or OTS hardware and performs basic RF functions. Commercial examples include Airspy R2 and RTL-SDR (aka RTL2832U).

The radio antenna 19 connects to the SDR hardware 17 to provide means of receiving and transmitting RF signals. The SDR server 18 provides software running on a general-purpose CPU, which is connected to the SDR hardware 17 via digital interface, typically USB. The SDR server 18 also provides a connection to an IP network, for sending and receiving radio data and to provide a centralized management path for the components at the remote radio access location. SDR server software performs: basic radio functions (modulation, AGC, noise filtering, etc.); audio frequency functions (two-tone detection, CTCSS squelching and injection, etc.); IP networking functions (transcoding, packetization, firewall); wide area connection (typically uses hardware co-located with and controlled by the general-purpose CPU), e.g. ethernet or cellular; and routing functions, that map radio channels to PTT talk groups via a radio channel routing table (RCRT).

The IP gateway connection 21 provides a means for the SDR system 11 to send to and receive from a cloud-based PTT server system 12.

The first gateway 20 is used to adapt digitized audio between the SDR system 11 and the PTT server 12. The first gateway 20 may also contain a management API client, used by a central management entity to control the specific SDR system 11.

Below is an example of a radio channel routing table. This table is used to map radio channels to IP streams.

| IP | UDP Port | Radio Frequency | CTCSS Tone | Two-Tone Sequence |
|---|---|---|---|---|
| 8.9.10.11 | 50002 | 155.7000 | 186.2 | n/a |
| 8.9.10.12 | 50004 | 155.0550 | 186.2 | 800, 1040 |
| 8.9.10.12 | 50006 | 155.0550 | 186.2 | 975, 1280 |

In an alternative arrangement to that shown in FIG. 1 the SDR Server 18 is co-located with the first gateway 20, wherein SDR receiver samples are sent over the IP GW connection 21. This alternative arrangement has the advantage of locating more complex configuration-oriented software in the cloud. However, this arrangement also increases bandwidth utilization in the IP gateway connection 21.

Figure 2:
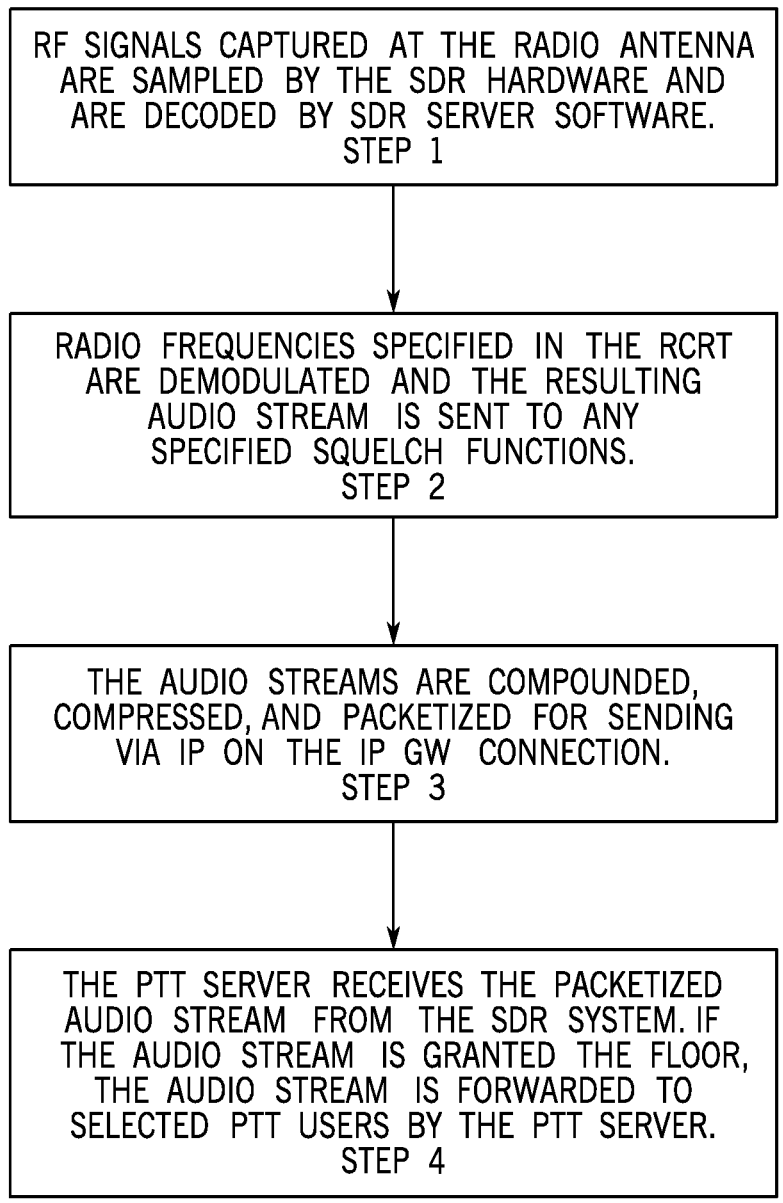
FIG. 2 is a flow chart describing how radio signals received at the SDR system are transmitted to PTT users.

Radio signals received at the SDR system can be transmitted to PTT users, as illustrated in FIG. 2. RF signals captured at the radio antenna 19 are sampled by the SDR hardware 17. These samples are decoded by SDR server software (Step 1). Radio frequencies that are specified in the RCRT are demodulated and the resulting audio streams are sent to any squelch functions specified in the RCRT entry for that radio channel (Step 2). Those audio streams are companded and compressed, then packetized for sending via IP on the IP GW connection 21 (Step 3). The PTT server 12, on receiving the packetized audio from the SDR system 11, subjects the incoming audio stream to floor control logic. If the incoming audio stream is granted the floor, the audio stream is forwarded to all PTT clients that are members of the group to which the audio stream is mapped (Step 4).

Figure 3:
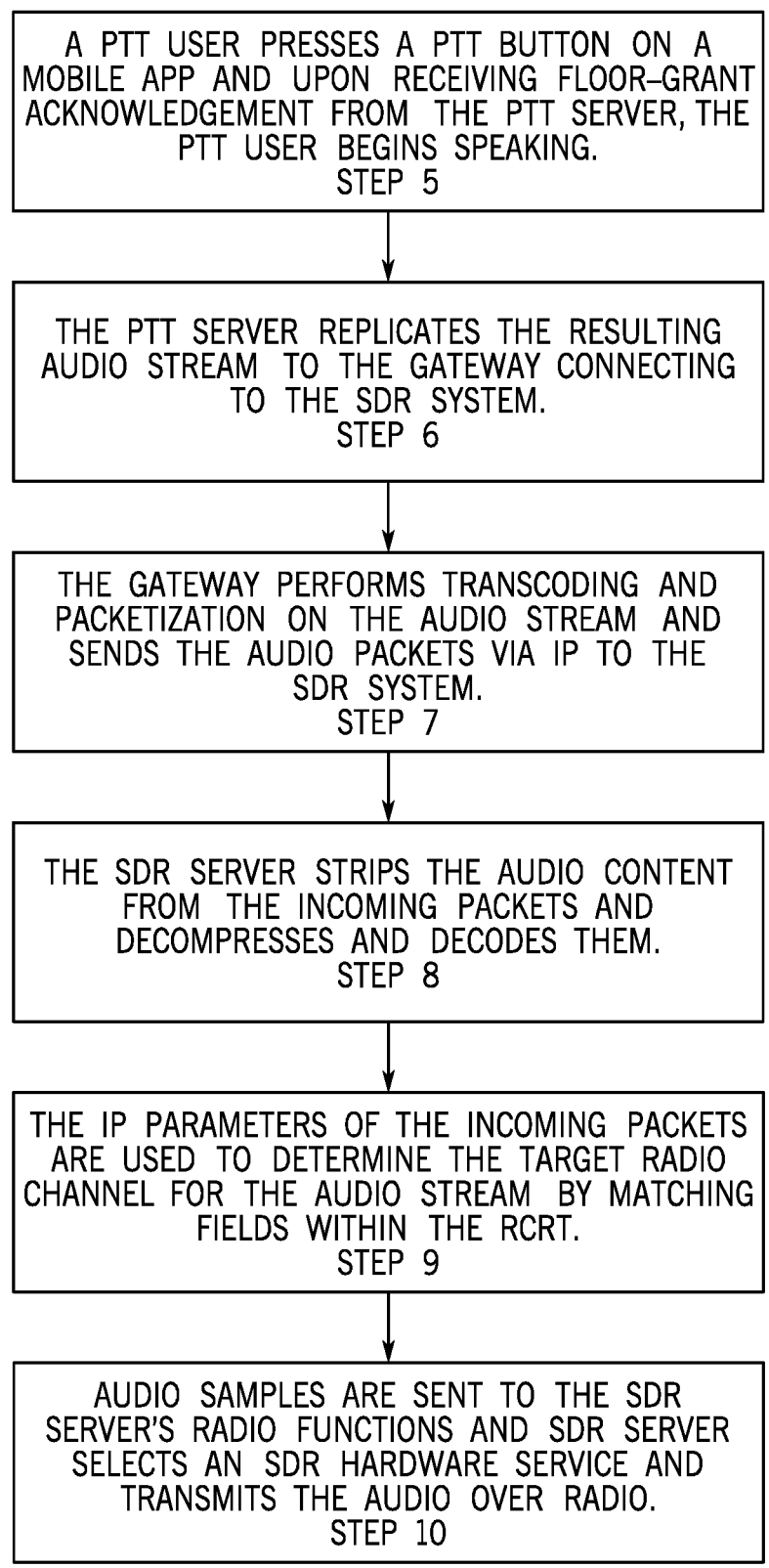
FIG. 3 is a flow chart describing how cellular or Wi-Fi signals from PTT users are transmitted to radio communications users.

Cellular or Wi-Fi signals from PTT users can be transmitted to radio communications users as illustrated in FIG. 3. If a PTT user attempts to obtain the floor on a specific talk-group by pressing a PTT button on the user's mobile app, upon receiving floor-grant acknowledgement from the PTT server 12, the PTT user begins speaking (Step 5). The PTT server 12 replicates the resulting audio stream to all members of the selected talk-group, including the first gateway 20 connecting to the SDR system 11 (Step 6). The first gateway 20 performs any transcoding and packetization required, then sends the audio packets via IP to the SDR system 11 (Step 7). The SDR server 18 strips the audio content from the incoming packet, then decompresses and decodes them (Step 8). The IP parameters of the incoming packet are used to determine the target radio channel for the audio stream, by matching fields within the RCRT (Step 9). Audio samples are sent to the SDR server's radio functions, according to the parameters of the matched RCRT entry. The SDR server 18 selects an SDR hardware service to transmit the audio over radio (Step 10). An SDR-PTT Control Protocol (SPCP) is used by the first gateway 20 and SDR Server 18 to enhance and secure the overall SDR PTToC service. The SPCP provides the following functions:

1) Advertising to the PTT server 12, by SDR server 18, the capabilities of the SDR server 18 (frequency range, etc.) and capabilities of connected SDR hardware 17;
2) Pushing RCRT entries from the PTT server 12 to the SDR server 18;
3) Creating a secure message digest of a packet by a packet source, to authenticate the packet source. The message digest can use a secret key that can either be configured on both the SDR server 18 or the PTT server 12, or that can be pushed from the PTT server 12 with a standard key exchange mechanism;
4) Indicating by the SDR server 18, the SDR receiver's carrier (COR) state for the radio frequency of interest; and
5) Indicating by the PTT server 12 error status, such as if the SDR server 18 has exceeded its transmitting time limit.

In most applications, receiving from the SDR system 11 occurs more frequently than does transmitting. This is a potential justification for dynamic SDR transmitter allocation. The PTT server 12 sends a request to transmit on a specific talk-group to the SDR server 18. The SDR server 18 then dynamically allocates an SDR transmitter from a pool of available units, configures it, then uses it for the duration of the next packet or a single "session".

The present invention is a PTToC system 10 that uses distributed SDR components for integration with 2-way radio systems. There is a control protocol between the SDR Server and the PTT Server via the first gateway. The PTT server registers its interest in specific radio frequencies with the SDR server. PTT server assigns talk-group names to the registered radio frequencies and passes them as part of registration to the SDR server. The SDR server, upon receiving a signal for one of the registered radio frequencies, sends an indication of the radio frequency to the PTT Server. The SDR server indicates its readiness status, as determined by its internal software state and the state of the connected hardware, to the PTT Server.

The SDR System has pooled and distributed SDR transmitter function. Upon receipt of audio data from the PTT server, the SDR server dynamically selects an SDR hardware device to transmit the audio over radio medium.

The SDR server has a control protocol. SDR hardware entities register their presence and status with the SDR server. SDR hardware entities register their location, based on either manually configured data or by using internal GPS function to provide the data. The SDR server sends audio data for transmitting to a specific SDR hardware device, based on device status and location, along with radio parameters, such as radio frequency, needed by the SDR hardware for transmission. The SDR hardware sends received radio audio to the SDR server and uses a control protocol to convey the frequency where the audio was received.

The PTToC system uses detection of specific two-two audio sequences as a means of squelching and routing 2-way radio audio to specific PTT talk-groups.

Figure 4:
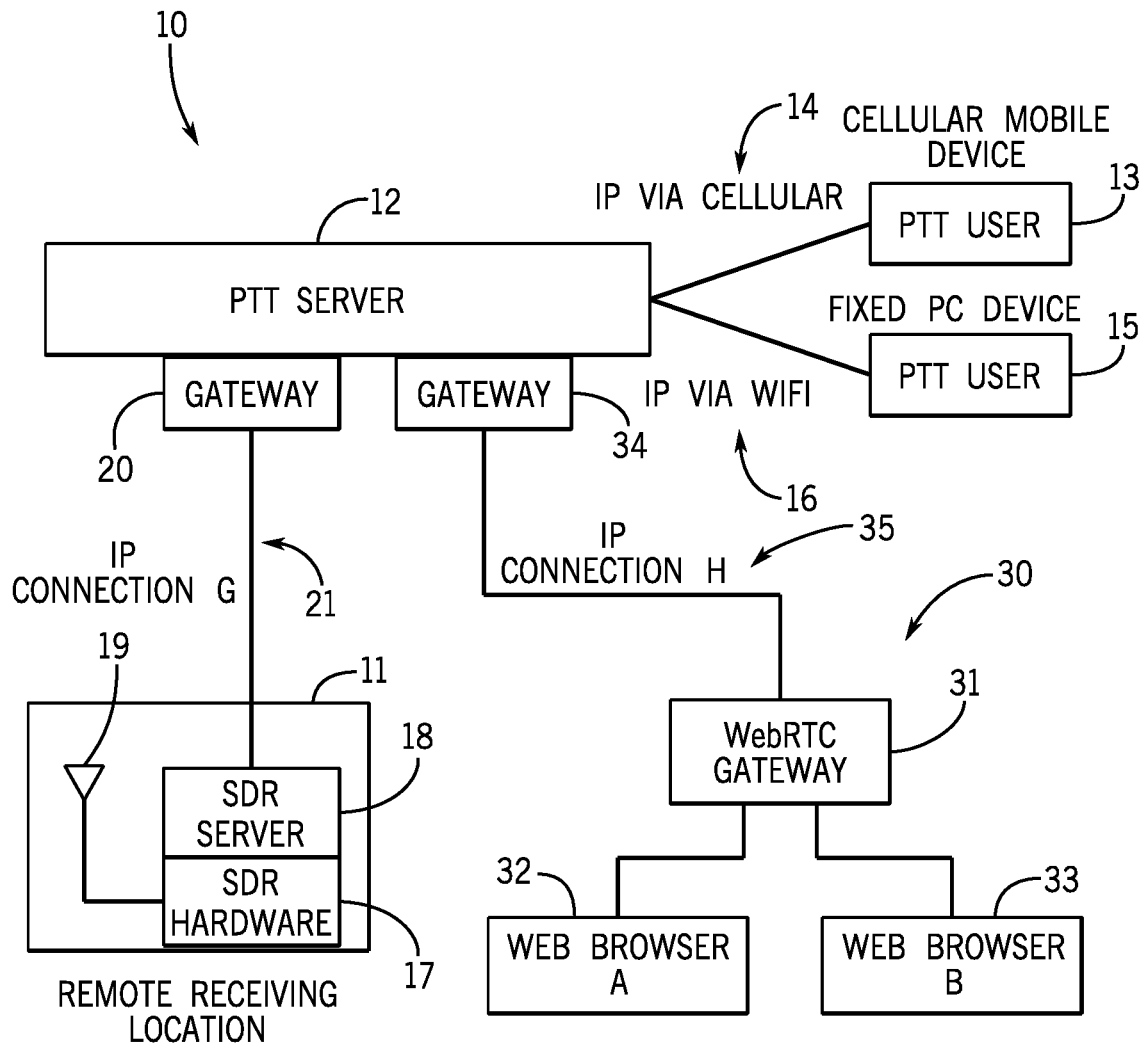
FIG. 4 is a diagram of a web real-time communication (WebRTC) system that provides web browsers and mobile applications with real-time communication via simple application programming interfaces (APIs) in a PTToC communication system.

FIG. 4 shows a diagram of a web real-time communication (WebRTC) system 30 that provides web browsers and mobile applications with real-time communication via simple application programming interfaces (APIs). The system is similar to the system described in FIG. 1, but with the addition of a WebRTC gateway 31 and web browsers, 32 and 33. The WebRTC Gateway 31 is a server application that presents a WebRTC interface towards browser clients 32 and 33 and a second gateway interface 34 towards a PTT server 12 through an IP connection 35. WebRTC is an open-source project allows audio and video communication to work inside web pages by allowing direct peer-to-peer communication, eliminating the need to install plugins or download native apps. Supported by Google, Microsoft, Mozilla, and Opera, WebRTC is being standardized through the World Wide Web Consortium (W3C) and the Internet Engineering Task Force (IETF). WebRTC's mission is to enable rich, high-quality RTP applications to be developed for the browser, mobile platforms, and IoT devices, and allow them all to communicate via a common set of protocols. The reference implementation is released as free software under the terms of a BSD license.

WebRTC is defined as a peer-to-peer service, in most cases web browser to web browser over the Internet. However, use of WebRTC Gateway enables WebRTC browser users to connect to digital networks. A WebRTC Gateway connects between WebRTC and an established VoIP technology, such as SIP. The usual process with WebRTC is that a user downloads a WebRTC JavaScript application. This application is then used to communicate with another user. A WebRTC gateway would usually contain the server from where a user would download the WebRTC Javascript application.

The ubiquity of WebRTC in browsers, and the ability to download WebRTC enabled applications to browsers via the Internet, provide an opportunity to dynamically deploy push-to-talk applications and pre-built configurations on terminal devices, with no product installation or setup required. The WebRTC gateway of the present invention is a specialized gateway that adapts WebRTC clients to a first PTT gateway interface. A user at web browser A connects to a URL that serves the WebRTC-based client code, which provides the browser user interface for PTT and connects to the WebRTC gateway 31. The WebRTC gateway 31 behaves just like another WebRTC client from the perspective a web browser 32 or 33. However, the gateway's 31 backend connects to the PTT server 12, effectively connecting the browsers 32 and 33 users to all other PTT users in a PTT call.

Figure 5:
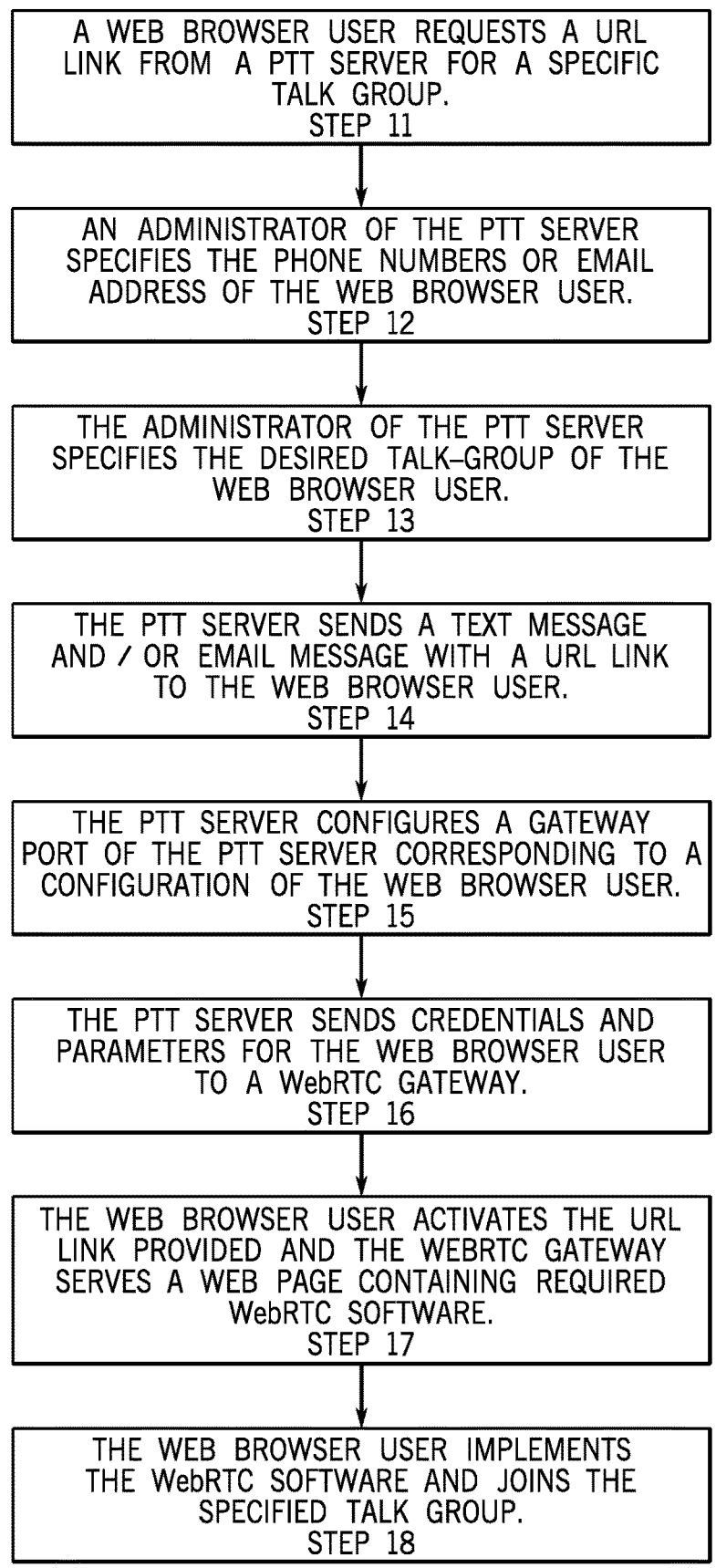
FIG. 5 is a flow chart describing a method of connecting web browser users to a PTT server to allow web browser users to join PTT communication with cellular, Wi-Fi, and radio communication users.

FIG. 5 illustrates a method of connecting web browser users to a PTT server to allow web browser users to join PTT communication with cellular, Wi-Fi, and radio communication users. A web browser user requests a URL link from a PTT server for a specific talk group (Step 11). An administrator of the PTT server specifies the phone number or email address of the web browser user (Step 12). The administrator of the PTT server specifies the desired talk-group of the web browser user (Step 13). The PTT server sends a text message and/or email message with a URL link to the web browser user (Step 14). The PTT server configures a gateway port of the PTT server corresponding to a configuration of the web browser user (Step 15). The PTT server sends credentials and parameters for the web browser user to a WebRTC gateway (Step 16). The web browser user activates the URL link provided and the WebRTC gateway serves a web page containing required WebRTC software (Step 17). Embedded in this page is either the specific parameters for this new entrant and their talk-group, or a link to a resource on the WebRTC server where this can be obtained programmatically. The web browser user implements the WebRTC software and joins the specified talk group (Step 18).

PTT talk-groups, whether radio-based, PTToC-based, or both, are defined mostly by a finite list of assigned users. Management of the assigned users for a talk-group is important because of their typically sensitive and critical nature. Talk-group management roles are, thus, often defined, to specify who can perform specific types of changes to the talk group. The ability for disparate talk-group owners to make connections with each other with their radios, PTToC-enabled phones, and/or talk-groups is referred to as Inter-agency interoperability. Such connections may be required on a permanent basis, or on a temporary basis, often in response to emergent incidents. Inter-agency interoperability management is difficult because the minimum subset of all responsible parties required to approve connection changes spans multiple organizations. The need for interoperable connections often arises in chaotic, emergency situations, which further complicates interoperability management.

It is a known industry practice to use a Memoranda of Understanding (MOU) to provide various procedures, rules, regulations, and the like to facilitate implementation of inter-agency interoperability. The parties to the MOU are the provider of the PTT server system and various users of the PTT server system. However, use of an MOU by PTT service providers and PTT talk-groups isn't universally practiced. Also, there is not widespread uniformity of MOU formats and policies. Finally, MOU exchange is often a paper-form process, which further limits its effectiveness.

The need to manage talk-group access is now more pronounced because the distance limitations of LMR radio no longer apply. Public safety requires systems that enable distributed and easy management of permission agreements that support all major radio and PTT vendors, and that support role-based talk-group administration, within permissions granted through MOUs and other management agreements.

Blockchain distributed ledger technology may be useful in the storage, retrieval, and distribution of MOUs within an MOU database system. Blockchain technology enables distributed public ledgers that hold immutable data in a secure and encrypted way and ensure that transactions can never be altered. While Bitcoin and other cryptocurrencies are the most popular examples of blockchain usage, this "distributed ledger technology" (DLT) is finding a broad range of uses. Data storage, financial transactions, real estate, asset management and many more uses are being explored.

MOU change logs must be verifiably correct, to ensure that access to critical communications resources is properly managed. Encryption technology such as used in blockchain databases can be used to provide the required MOU integrity assurances.

Figure 6:
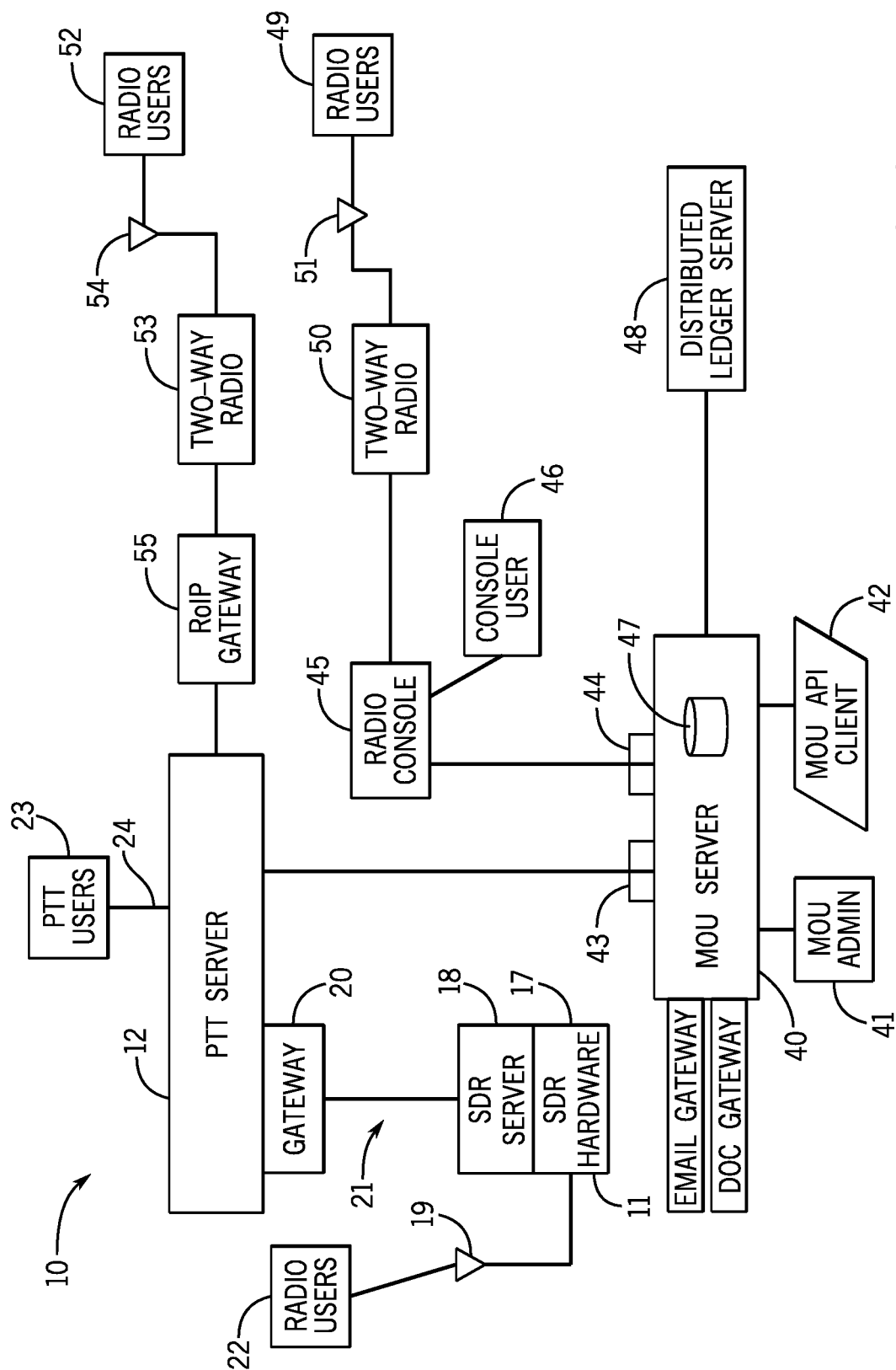
FIG. 6 is a diagram of the PTToC system of the present invention integrated with a memorandum of understanding (MOU) system implemented on a MOU server.

FIG. 6 shows the PTToC system of the present invention integrated with an MOU system implemented on a MOU server 40. MOU administrators 41 use the MOU server to access and manage their talk-groups along with other external talk-groups. An HTTP server for web pages provides a typical web site interface for MOU administrators to perform MOU management functions, such as adding talk-groups, creating connections, etc. An MOU API HTTP client server 42 for incoming API handling provides programmatic access to perform MOU management functions. Server 42 is typically used to connect with external systems, as a means of integration. An API interface 43 for PTT servers is used for queries and commands to a PTT server 12, for example, to implement PTToC connection configurations created by MOU administrators. An API Interface 44 for Radio Consoles 45 is used for queries and command to radio consoles and radio console users 46, for example, to implement radio system connection configurations created by MOU administrators. A MOU database 47 contains all system data including talk-groups and their administrators, users and roles, and a ledger of all MOU actions. This database 47 is implemented with a distributed ledger system, derived from blockchain concepts. While the MOU database 47 can reside on the single physical server 40, the MOU database 47 may also support deployment of a distributed ledger server 48 on multiple physical server nodes, which provides additional benefits, such as node diversity and an inherent protection against malicious access and actions. The MOU server's 40 connection to the PTT server 12 enables the PTT server 12 to ensure that talk-group membership provisioning is completed within constraints of existing MOUs. The MOU server's 40 connection to the PTT server 12 also allows the MOU server 40 to request that the PTT server 12 implement connection changes implied in a new or modified MOU. The MOU server's connection to a Radio Console 45 is for similar purposes as the PTT server 12 connection. Radio users 49 use two-way radios with antennae 51 to communicate with the Radio Console 45. Likewise, radio users 52 use two-way radios 53 with antennae 54 to communicate with the PTT server 12 through a RoIP gateway 55.

MOU entities such as Channels and Connections are modeled as assets. Assets have fixed attributes, such as their ID, and variable metadata attributes. Asset attributes are specified when the asset is created. At this time, the creator's private key and cryptographic hash of the asset's attributes are created and stored as a cryptographic signature. Whenever the asset's attributes are changed, a new signature is created which is composed of a previous signature, the private key of the asset modifier, and a new value of the asset's attributes.

This method of creating a cryptographic signature for an asset that contains a pointer back to a previous version of the asset is the essence of how the blockchain is used to create an immutable audit trail for MOU assets managed by the MOU system.

The MOU system can optionally be implemented with multiple federated physical servers to implement the distributed ledger behavior described above. This means there can be no single point of failure or control. The former provides typical fault tolerance arising from equipment and network failure conditions. However, the ability to remove a need for central control provides a verifiable control mechanism, without any central control authority, which is a key characteristic of blockchain and which allows multiple independent agencies to control their communications connections in a controlled manner, but without any central authority to manage the process.

The MOU system provides an online web site and API-based web service for management of interoperability agreements and connections. The system enables talk-group resource owners to request interop connections, implement a request review process, verify credentials, all with the assurance of a cryptographically verifiable audit trail. The system utilizes a blockchain based distributed ledger, which provides several forms of verifiable immutability. For example, all data is replicated or copied to several different places. The replication factor can be set by a consortium. The higher the replication factor, the more difficult it becomes to change or delete all replicas. All nodes monitor all changes and if some unallowed change happens, then appropriate action can be taken, providing an internal "watch dog" function. Cryptographic signatures can be used to check if messages or transactions have been tampered with enroute and to verify who signed the messages. Each transaction must be signed by one or more parties. Node diversity provides that no one event (e.g. natural disaster or operating system bug) can compromise all of the nodes.

This MOU system takes advantage of a blockchain-based mechanism to store authoritative administrative role assignments for each talk-group and to store an entire administrative history of PTT talk-groups. The MOU system takes advantage of distributed servers to store administrative history of PTT talk-groups and provides an online, role-based review and approval process for interoperability agreements. Other advantages of the MOU system include a reminder service for temporary interop agreements, warning of impending automatic changes; direct use of a PTT system providing APIs, to implement interop connections when agreements are created and validated; and direct use of PTT providing APIs, to audio the PTT system, to check for any connections that are not validated in the agreement database, and to notify parties of the lack of validation.

In response to numerous mass homicides at schools and other campus environments, a new class of mobile app has emerged who purpose is to allow campus staff and students to alert authorities in an emergency. These panic apps typically have a 'panic button' that contacts 911 when pressed. The radio integrated PTToC System 10 can provide a new class of panic app, geared towards campus School Resource Officers (SROs), school administrators and police. This panic app combines the panic button functionality with the ability to immediately talk with the police on their radio system.

Figure 7:
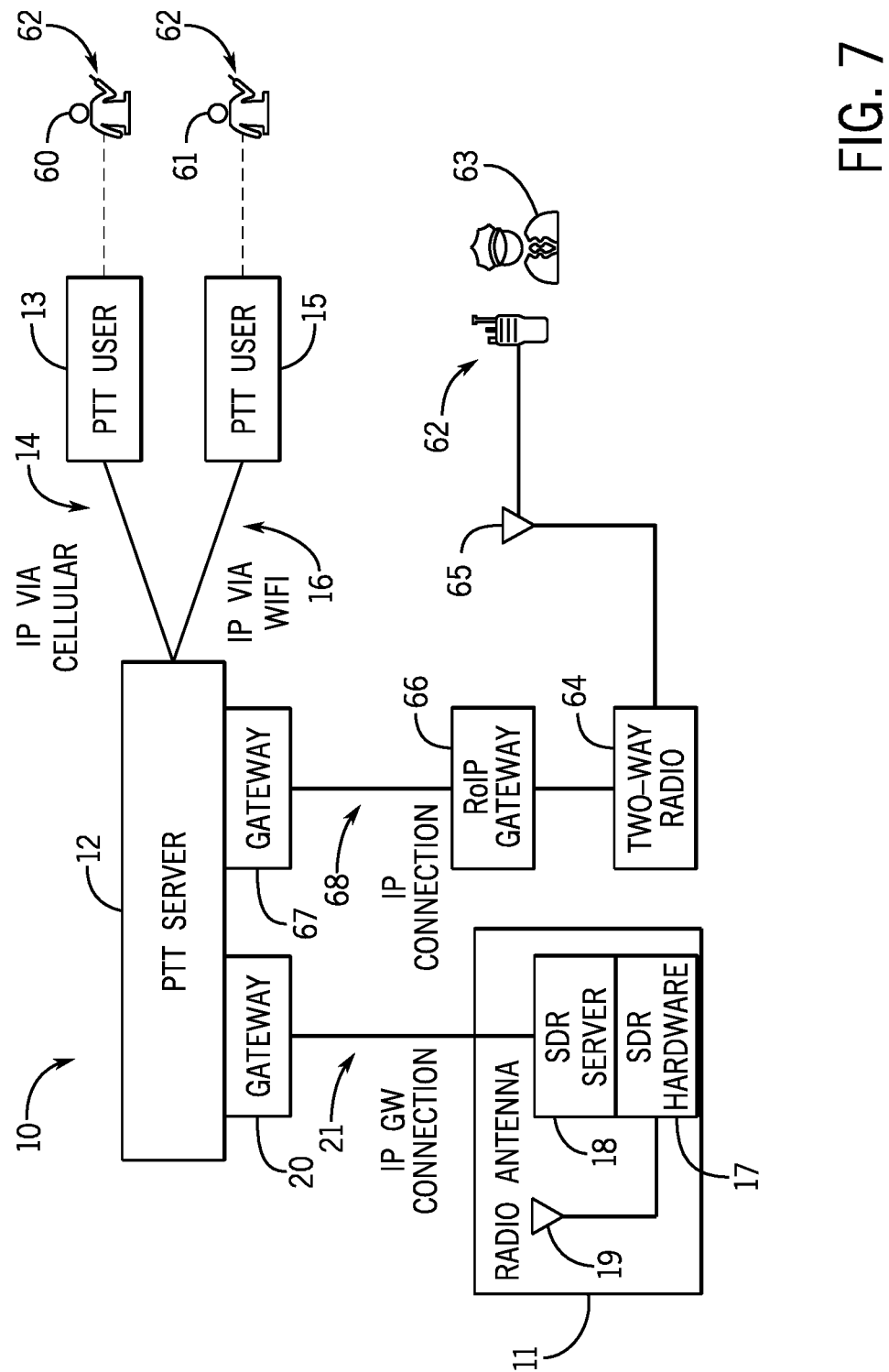
FIG. 7 is a diagram of a panic button application and audio tone sequence system integrated with the PTToC system of the present invention.

FIG. 7 shows a diagram of a panic button application and audio tone sequence system of the present invention integrated with the PTToC system 10. Users of cellular mobile devices 60, for example, SROs, and users of fixed PC devices 61, for example, teachers, principals, and superintendents, can have a panic app in their devices with a panic button 62. Police 63 can also have the panic app in their radios 64 with a panic button 62. Their two-way radios 64 having antennae 65 that communicates with the PTT server 12 through an RoIP gateway 66 and a PTT server gateway 67.

Campus personnel, including teachers, principals, superintendents, and SROs can have the mobile panic app on their smartphone devices. Their user accounts on the PTT server 12 are configured as a closed system, i.e., they don't share talk-groups or contacts or panic button facilities with the general public. The panic app contains a panic button 62 that when pressed, will create an emergency alert that will be sent to all other panic app users. This can include all users on the campus account, plus any other panic app user that should be notified in an emergency. This emergency alert also opens a PTT call on a predefined talk-group. If this talk group is one that is radio integrated, it effectively connects all the panic app users with all radio users, which could include police and other first responders.

PTToC using software defined radio systems provide integration of land mobile radio audio with cloud-based PTT networks using an SDR system which has control protocols between PTT servers and SDR servers and dynamic SDR transmitter allocation with oversubscription. The SDR system provides integrated fire-tone detection with separate PTT alerting per toned out sequence.

The WebRTC gateway system adapts PTToC audio and signaling to WebRTC clients, enables PTT calls from any WebRTC-enabled browser, and generates web URL links that can be automatically distributed and whose targets cause joining to PTT talk-groups via the WebRTC gateway.

The MOU web system provides a communication system for PTT system owners to manage provisional access for non-owner agencies and users through an authoritative database of agreements, automatically providing agreed upon sharing. The MOU web system provides the use of blockchain-based mechanisms to store authoritative administrative role assignments for each talk-group and to store entire administrative history of PTT talk-groups. Distributed servers can be used to store administrative history of PTT talk-groups. The MOU web system provides online, role-based review and approval processes for interoperability agreements and a reminder service for temporary interop agreements, warning of impending automatic changes. Direct use of PTT provisioning APIs are provided to audio PTT system and check for any connections that are not validated in the agreement database and to notify parties of related discrepancies. A system is provided for defining specific exception conditions and triggering of agreements when those conditions are met.

A mobile panic button application is provided that automatically initiates a connection to a PTT talk-group and sends a text message to, for example, a 911 number. Also provided are the ability for a user to automatically join or leave a PTT talk-group based on the user's GPS location and a redundant backup that monitors the state of a PTT SDR gateway connection and switches to alternate gateway internet connection as needed.

An important function of radio communications is two-tone audio paging, also known as fire-tones. In the US, many fire agencies within a region share a common radio channel. When a new dispatch call goes out on the radio, a sequence of audio tones is sent on the radio channel, prior to the dispatcher speaking, to specify which fire stations in the region are being asked to respond. Firefighters often program a squelch into their radios that is broken only when the tone-out for their station is received on the radio.

When the PTT server 12 receives audio on a frequency listed in the RCRT, it further checks the table entry to determine if two-tone audio squelching function is required for this frequency. If so, the received audio is routed to a tone detection function. If this function detects a sequence of valid tones that match values configured in the RCRT, then the audio stream is sent to an IP/UDP combination specified in the table entry. This combination defines a talk-group on the PTT server 12.

In one embodiment of the PTToC communication system one or more PTT servers 12 receive audio transmissions through integrated radio channels from cellular mobile devices 60 and computers 61, through the internet 14, and from two-way radio communication devices 64 through a radio over internet protocol gateway 66 and a PTT server gateway 67. The PTT server 12 decodes an audio transmission and identifies one or more specific audio tone sequences. The PTT 12 server sends notifications of the identified specific audio tone sequences to users of the cellular mobile devices 60, computers 61, and two-way radio communication devices 64. The notification can be a text message to a predefined PTT group, a delayed buffered replay of the audio transmission, one or more specific audio tone sequences with audio transmission occurring before and after the audio tone sequences, or an emergency alert sent to predefined members of a PTT group, or a combination thereof. Alternatively, a PTT client may be used as the source of the audio to be decoded to perform the decoding. The PTT client is a pseudo user and included in the talk groups that have audio that is to be decoded, and in talk groups to notify other users/groups of a decoding event. The delayed buffered relay, preferably, decodes the PTT call in real time and immediately sends the notifications upon detection of the audio tone sequence.

Figure 8:
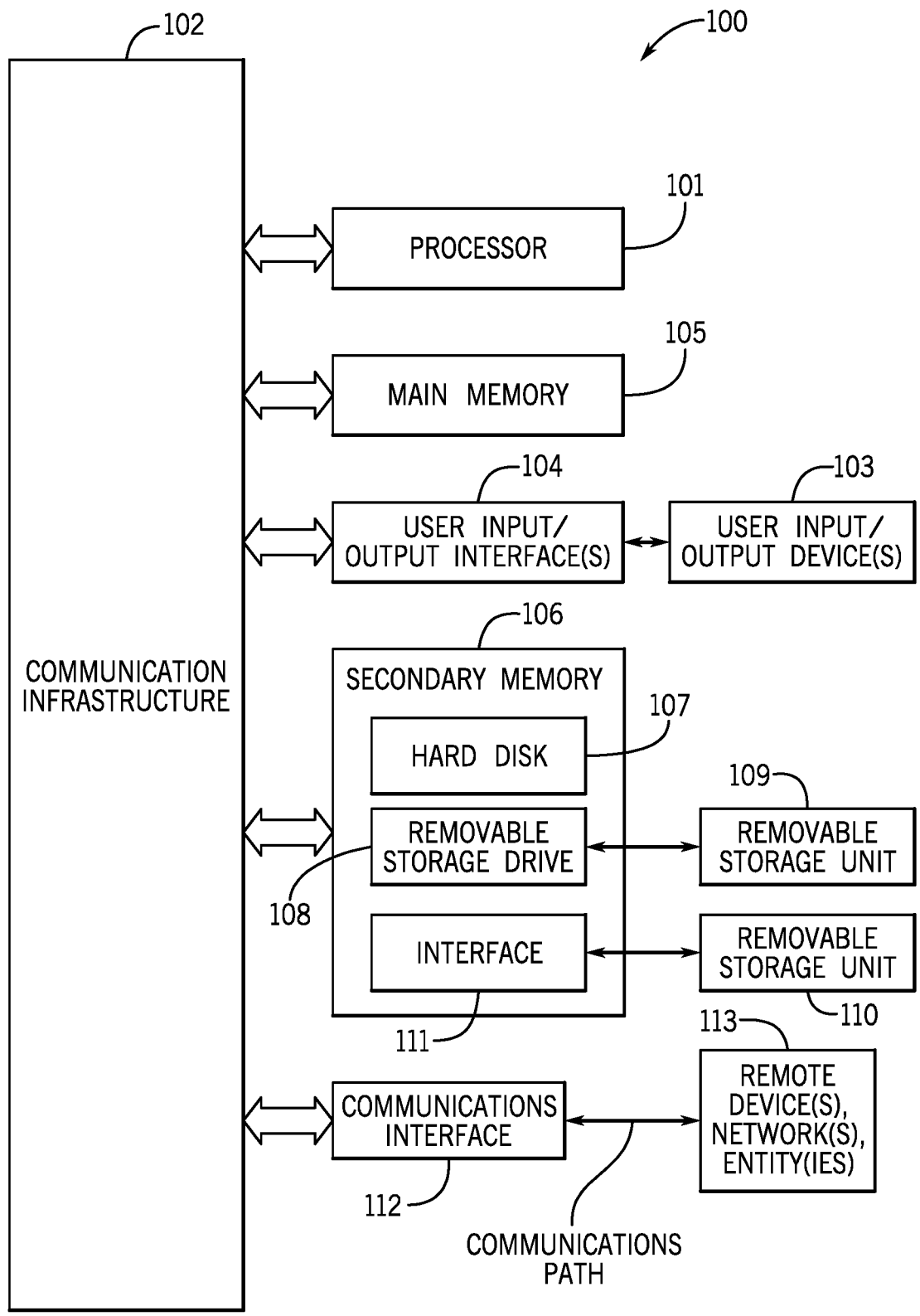
FIG. 8 is a diagram of an example computing system.

FIG. 8 is a diagram of an example computing system. The various embodiments disclosed herein can be implemented, for example, using one or more well-known computer systems, such as computer system 100 shown in FIG. 8. Computer system 100 can be any well-known computer capable of performing the functions described herein.

Computer system 100 includes one or more processors (also called central processing units, or CPUs), such as a processor 101. Processor 101 is connected to a communication infrastructure or bus 102.

One or more processors 101 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 100 also includes user input/output device(s) 103, such as monitors, keyboards, pointing devices, etc., that communicate with communication infrastructure 102 through user input/output interface(s) 104.

Computer system 100 also includes a main or primary memory 105, such as random access memory (RAM). Main memory 105 may include one or more levels of cache. Main memory 105 has stored therein control logic (i.e., computer software) or data.

Computer system 100 may also include one or more secondary storage devices or memory 106. Secondary memory 106 may include, for example, a hard disk drive 107 or a removable storage device or drive 108. Removable storage drive 108 may be a floppy disk drive, a magnetic tape drive, a compact disk drive, an optical storage device, tape backup device, or any other storage device/drive.

Removable storage drive 108 may interact with a removable storage unit 109. Removable storage unit 109 includes a computer usable or readable storage device having stored thereon computer software (control logic) or data. Removable storage unit 109 may be a floppy disk, magnetic tape, compact disk, DVD, optical storage disk, and/any other computer data storage device. Removable storage drive 108 reads from or writes to removable storage unit 109 in a well-known manner.

Secondary memory 106 may include other means, instrumentalities or other approaches for allowing computer programs or other instructions or data to be accessed by computer system 100. Such means, instrumentalities or other approaches may include, for example, a removable storage unit 110 and an interface 111. Examples of the removable storage unit 110 and the interface 111 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 100 may further include a communication or network interface 112. Communication interface 112 enables computer system 100 to communicate and interact with any combination of remote devices, remote networks, remote entities, etc. (individually and collectively referenced by reference number 113). For example, communication interface 112 may allow computer system 100 to communicate with remote devices 113 over communications path 114, which may be wired or wireless, and which may include any combination of LANs, WANs, the Internet, etc. Control logic or data may be transmitted to and from computer system 100 via communication path 114.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the PTToC system exemplified in FIG. 1 can be integrated with the web real-time communication system exemplified in FIG. 4, with the MOU system exemplified in FIG. 6, and with the panic application system exemplified in FIG. 7. Any suitable cellular mobile devices or fixed PC devices can be used with the PTT server of the present invention. Any suitable software may be implemented in the SDR system of the present invention.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A push-to-talk over cellular (PTToC) communication system, comprising:
  a) one or more push-to-talk (PTT) servers wherein the one or more PTT servers receive audio transmissions through integrated radio channels from cellular mobile devices and computers through the internet and from two-way radio communication devices through a radio over an internet protocol gateway and a PTT server gateway;
  b) an audio transmission is decoded and one or more specific audio tone sequences are identified; and
  c) notifications of the one or more identified specific audio tone sequences are sent to users of the cellular mobile devices, computers, and two-way radio communication devices.

2. The push-to-talk over cellular communication system of claim 1, wherein the notification is a text message to a predefined PTT group.

3. The push-to-talk over cellular communication system of claim 1, wherein the notification is a delayed buffered replay of the audio transmission.

4. The push-to-talk over cellular communication system of claim 1, wherein the notification includes the one or more specific audio tone sequences with the audio transmission before and after the one or more specific audio tone sequences.

5. The push-to-talk over cellular communication system of claim 1, wherein the notification includes an emergency alert sent to predefined members of a PTT group.

6. The push-to-talk over cellular communication system of claim 1, wherein the PTT server decodes the audio transmissions and sends the one or more identified specific audio tone sequences notifications.

7. The push-to-talk over cellular communication system of claim 1, wherein a PTT client decodes the audio transmission and sends the one or more identified specific audio tone sequences notifications.

8. A push-to-talk over cellular (PTToC) communication system, comprising:
  a) one or more push-to-talk (PTT) servers wherein the one or more PTT servers receive audio transmissions through integrated radio channels from cellular mobile devices and computers through the internet and from two-way radio communication devices through a radio over internet protocol gateway and a PTT server gateway;
  b) the PTT server or a PTT client decodes an audio transmission and identifies one or more specific audio tone sequences; and
  c) the PTT server or the PTT client sends notifications to users of the cellular mobile devices, computers, and two-way radio communication devices of the one or more identified specific audio tone sequences,
  wherein the notification is a text message to a predefined PTT group,
  wherein the notification is a delayed buffered replay of the audio transmission,
  wherein the notification includes the one or more specific audio tone sequences with the audio transmission before and after the one or more specific audio tone sequences; or
  wherein the notification includes an emergency alert sent to predefined members of a PTT group, or a combination thereof.

9. A method of sending notification of audio tone sequences to users in a push-to-talk over cellular (PTToC) communication system, comprising:
  1) providing one or more push-to-talk (PTT) servers wherein the one or more PTT servers receive audio transmissions, through integrated radio channels, from cellular mobile devices and computers through the internet, and from two-way radio communication devices through a radio over internet protocol gateway and a PTT server gateway;

2) decoding an audio transmission and identifying one or more specific audio tone sequences; and 3) sending notifications of the one or more identified specific audio tone sequences to users of the cellular mobile devices, computers, and two-way radio communication devices.

10. The method of claim 9, wherein the notification is a text message to a predefined PTT group.

11. The method of claim 9, wherein the notification is a delayed buffered replay of the audio transmission.

12. The method of claim 9, wherein the notification includes the one or more specific audio tone sequences with the audio transmission before and after the one or more specific audio tone sequences.

13. The method of claim 9, wherein the notification includes an emergency alert sent to predefined members of a PTT group.

14. The method of claim 9, wherein the PTT server decodes the audio transmissions and sends the one or more identified specific audio tone sequences notifications.

15. The method of claim 9, wherein a PTT client decodes the audio transmission and sends the one or more identified specific audio tone sequences notifications.

16. A method of sending notification of audio tone sequences to users in a push-to-talk over cellular (PTToC) communication system, comprising:

1) providing one or more push-to-talk (PTT) servers wherein the one or more PTT servers receive audio transmissions, through integrated radio channels, from cellular mobile devices and computers through the internet, and from two-way radio communication devices through a radio over internet protocol gateway and a PTT server gateway;

2) decoding an audio transmission in the PTT server or in a PTT client and identifying one or more specific audio tone sequences; and 3) sending from the PTT server or from the PTT client notifications of the one or more identified specific audio tone sequences to users of the cellular mobile devices, computers, and two-way radio communication devices, wherein the notification is a text message to a predefined PTT group, wherein the notification is a delayed buffered replay of the audio transmission, wherein the notification includes the one or more specific audio tone sequences with the audio transmission before and after the one or more specific audio tone sequences; or wherein the notification includes an emergency alert sent to predefined members of a PTT group, or a combination thereof.

* * * * *